Figure 3:
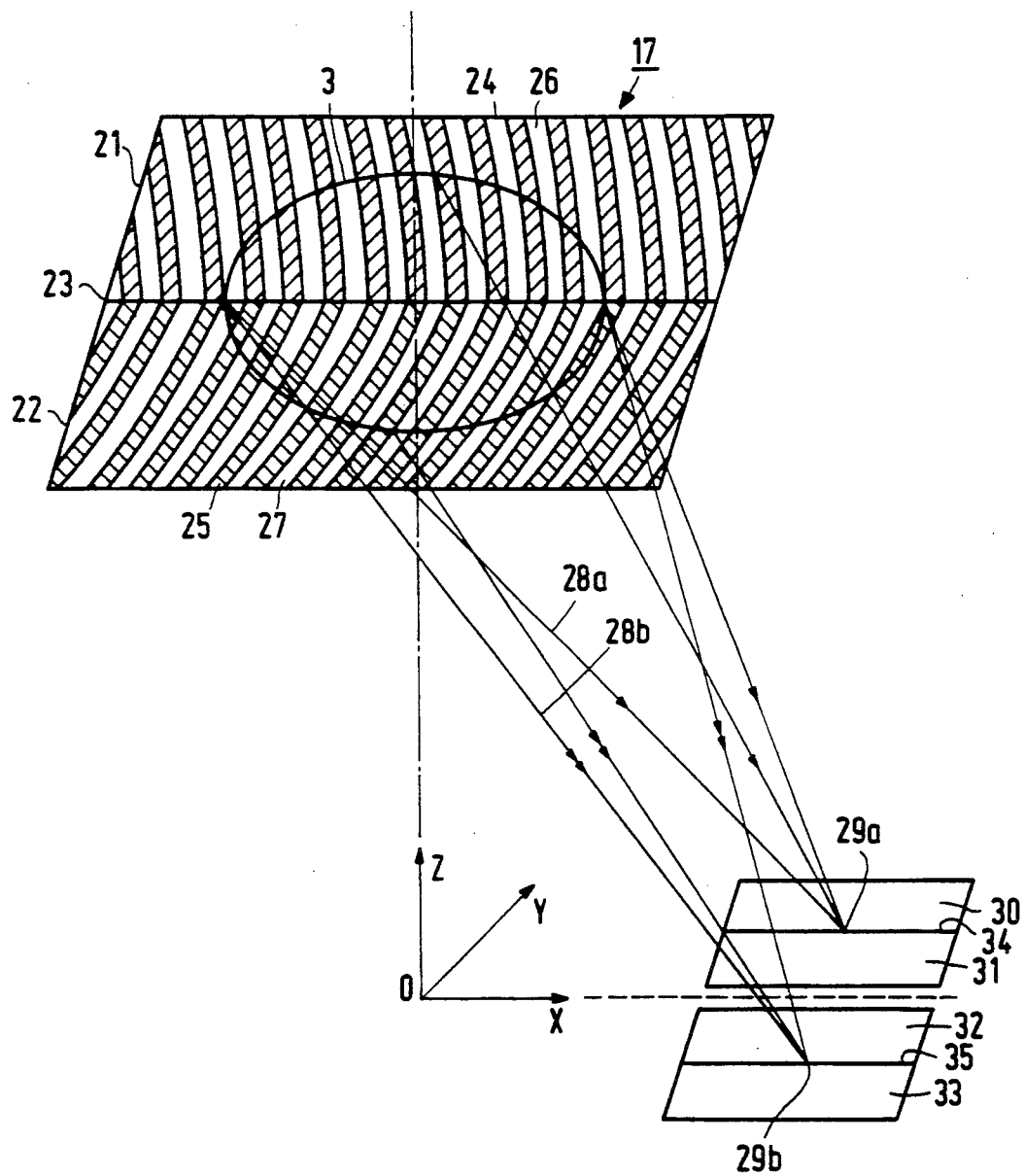

United States Patent [19]

Opheij et al.

[11] Patent Number: 5,144,131
[45] Date of Patent: Sep. 1, 1992

[54] DEVICE FOR OPTICALLY SCANNING AN INFORMATION PLANE DETECTING BORDER PORTIONS OF LIGHT BEAM

[75] Inventors: Willem G. Opheij; Henricus M. M. Kessels; Christiaan H. F. Velzel, all of Eindhoven, Netherlands

[73] Assignee: U. S. Philips Corporation, New York, N.Y.

[21] Appl. No.: 718,734

[22] Filed: Jun. 21, 1991

[30] Foreign Application Priority Data

Sep. 12, 1990 [NL] Netherlands ............... 9002007

[51] Int. Cl.⁵ ............................... G05B 1/00
[52] U.S. Cl. ........................... 250/202; 369/44.23
[58] Field of Search ................. 250/201.5, 202; 359/558, 566; 369/44.11, 44.23, 109

[56] References Cited

U.S. PATENT DOCUMENTS

| | | | |
|---|---|---|---|
| 4,835,378 | 5/1989 | Coops | 369/44.23 |
| 4,864,118 | 9/1989 | Opheij et al. | 250/202 |
| 4,924,079 | 5/1990 | Opheij et al. | 250/201.5 |
| 4,929,823 | 5/1990 | Kato et al. | 250/201.5 |
| 4,983,017 | 1/1991 | Tsuji et al. | 359/566 |

FOREIGN PATENT DOCUMENTS 0378438  7/1990  European Pat. Off.

Primary Examiner—David C. Nelms
Assistant Examiner—Allen S.
Attorney, Agent, or Firm—David R. Treacy

[57] ABSTRACT

An optical scanning device for scanning an information plane (2) having tracks is described, which device comprises a radiation source (4) supplying a scanning beam (3) and an objective system (5) for focusing the scanning beam to a scanning spot on the information plane (2). To obtain two tracking spots, two grating parts located at both sides of the scanning beam and capturing border rays from the radiation source are used.

20 Claims, 6 Drawing Sheets

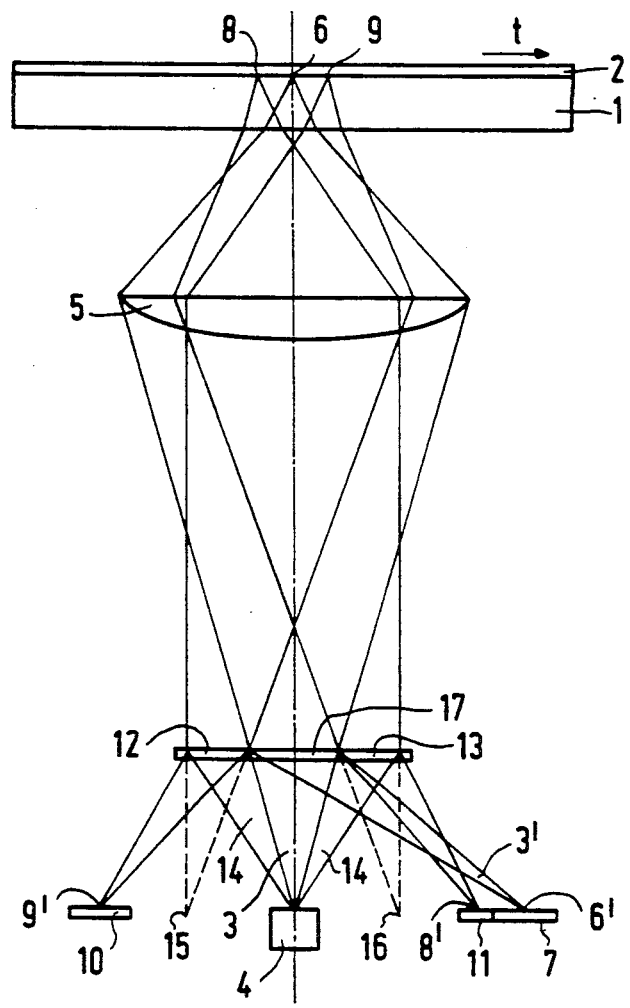
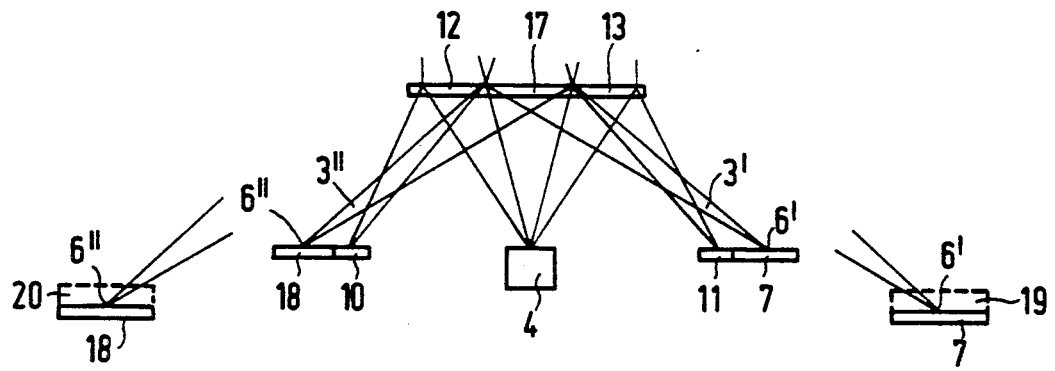
FIG.1
FIG.2

DEVICE FOR OPTICALLY SCANNING AN INFORMATION PLANE DETECTING BORDER PORTIONS OF LIGHT BEAM

The invention relates to a device for optically scanning a radiation-reflecting information plane having tracks, which device comprises a radiation source supplying a scanning beam, an objective system for focusing the scanning beam to a scanning spot in the information plane and for reimaging the scanning spot on a radiation-sensitive detection system for generating an information signal, and a tracking grating arranged in the radiation path between the radiation source and the objective system for forming two tracking beams which are focused by the objective system in two tracking spots in the information plane, said spots being reimaged on two tracking detectors for generating a tracking error signal.

The scanning beam is understood to mean that part of the radiation beam supplied by the radiation source which is captured by the objective system and is focused to form the scanning spot. The scanning beam may be either an unmodulated beam with which a written information plane can be read, or a modulated or unmodulated beam with which information can be written and/or erased in an information plane. Tracking is understood to mean that the centre of the scanning spot in the information plane is positioned on the centre line of a track to be scanned.

A device of the type described in the opening paragraph is known from European Patent Application 0,305,169. In the known device two tracking beams are formed by a grating which is arranged in the scanning beam. This device has the drawback that a part of the power of the scanning beam is used for forming tracking beams so that the intensity of the scanning spot becomes smaller. This is particularly detrimental when information is to be inscribed at a high speed, but it may also result in a decrease of the signal-to-noise ratio of the information signal during reading.

It is an object of the invention to provide a device which does not have the above-mentioned drawback and in which optimum use is made of the radiation supplied by the radiation source when forming the tracking beams. The device according to the invention is characterized in that the tracking grating comprises two parts located in one plane at both sides of the scanning beam, which parts capture border portions of the beam from the radiation source.

Semiconductor diode lasers are used as radiation sources in modern scanning devices for optical record carriers. The cross-section of the radiation beam supplied by a diode laser has a shape which is approximately elliptic. To be able to form a minimal, diffraction-limited scanning spot on the information plane, it is ensured that the beam just fills the pupil of the objective system in the direction of the minor axis of the ellipse. In the current scanning devices the border portions of the beam in the direction of the major axis of the ellipse are not utilized.

The present invention is based on the recognition that tracking beams can be formed from these border portions so that it is not necessary to extract energy from the scanning beam.

It is to be noted that European Patent Application 0,351,953 describes an optical scanning device in which a grating is used for forming two auxiliary beams from the border portions of the beam emitted by the radiation source. However, these auxiliary beams are not tracking beams but are used to measure the tilt of the disc with respect to the optical axis of the scanning device. The tracking beams themselves are formed from the scanning beam.

It is further known from Japanese Patent Application 58-35737 to form tracking beams from the border portions of the beam by means of a trapezoidal prism. Simplification of the construction of the device, which can be achieved with a grating, cannot be realised when using a prism.

The device according to the invention is preferably further characterized in that a part of the scanning beam reflected by the information plane is deflected towards the detection system by a main grating which is arranged in the radiation path of the scanning beam between the radiation source and the objective system, the plane of the main grating being parallel to the plane of the tracking grating. Similar elements are then used for performing different functions, which is advantageous from a manufacturing technical point of view.

The main grating and the tracking grating may be arranged at different sides of one carrier. The device may, however, also be characterized in that the main grating and the tracking grating are located in one plane. The two gratings can then be manufactured simultaneously by means of one mould, for example, via a replica process.

The device according to the invention is preferably further characterized in that the tracking beams are border portions of the beam from the radiation source which are diffracted in the +1st and −1st orders or higher orders by the tracking grating. This is the simplest way of obtaining tracking beams having the desired direction and power. The first-order beams generally constitute the most powerful, diffracted beams. Moreover, this power can be adjusted by adapting the shape of the grooves of the tracking grating. If the border portions of the source beam have much power, the intensity of the tracking spots can be maintained at such a low level, for example, by giving the grating grooves a small depth, that these spots do not cause any preheating of the information layer, which affects writing with the scanning beam.

There are two classes of embodiments of the device according to the invention. The first class is characterized in that the tracking grating is arranged in the radiation path of the tracking beams reflected by the information plane. The tracking grating is then used for the formation of the tracking beams as well as for coupling out the reflected tracking beams towards the tracking detectors.

A first embodiment of the first class is characterized in that the main grating deflects the reflected scanning beam towards the tracking detectors.

In practice it may be a problem to obtain sufficient radiation on a detection system, particularly when the power in the 0 order of the scanning beam must be as large as possible so that there is little power in the diffracted orders. A second preferred embodiment of the first class is therefore characterized in that an additional detection system is provided, the two detection systems capturing the radiation of the portions of the reflected scanning beam diffracted in the +1st order and the −1st order, respectively.

A third embodiment of the first class is characterized in that at least one detection system is integrated with a tracking detector on one substrate. The integration of the detectors provides a constructive advantage.

A fourth embodiment of the first class is characterized in that the main grating deflects the reflected scanning beam in a direction perpendicular to the direction of the tracks. This geometry ensures that a tracking error cannot influence the focus error signal in devices in which the focus error signal is generated by means of the Foucault method.

The second class of embodiments is characterized in that the main grating is also arranged in the radiation path of the reflected tracking beams.

A first embodiment of the second class is characterized in that the main grating deflects the reflected scanning beam and tracking beams in a direction perpendicular to the direction of the tracks. This geometry ensures that a tracking error cannot influence the focus error signal in devices in which this signal is generated by means of the Foucault method.

A second embodiment of the second class is characterized in that the detection system and the tracking detectors are integrated on one substrate. This provides a constructive advantage.

A device according to the invention, which is suitable for reading an information plane by means of the magneto-optical effect, may be further characterized in that a linear polarizer is arranged in front of each detection system in the radiation path of the reflected scanning beam, the two polarizers being oriented mutually perpendicularly. Each detection system now detects only radiation having a specific state of polarization.

Various focus error detection methods may be used in the device according to the invention. An embodiment in which a first possibility is realised is characterized in that the main grating comprises two parts for forming two focus detection beams, and in that the detection system comprises two radiation-sensitive detectors for each one of these beams.

An embodiment in which a second possibility is realised is characterized in that the main grating introduces astigmatism in a deflected beam, and in that the detection system comprises a radiation-sensitive four-quadrant detector.

Figure 4:
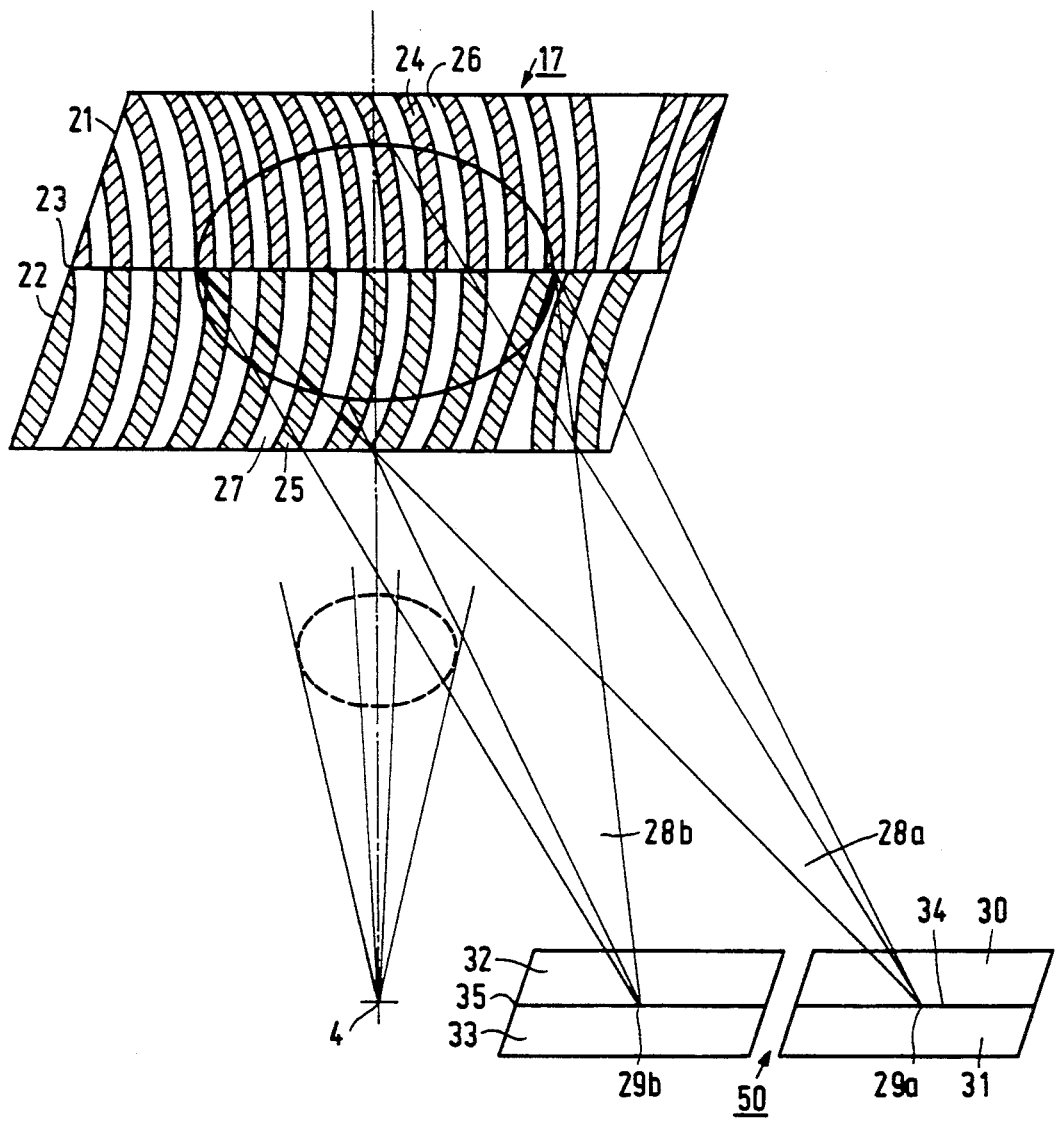
Figure 5:
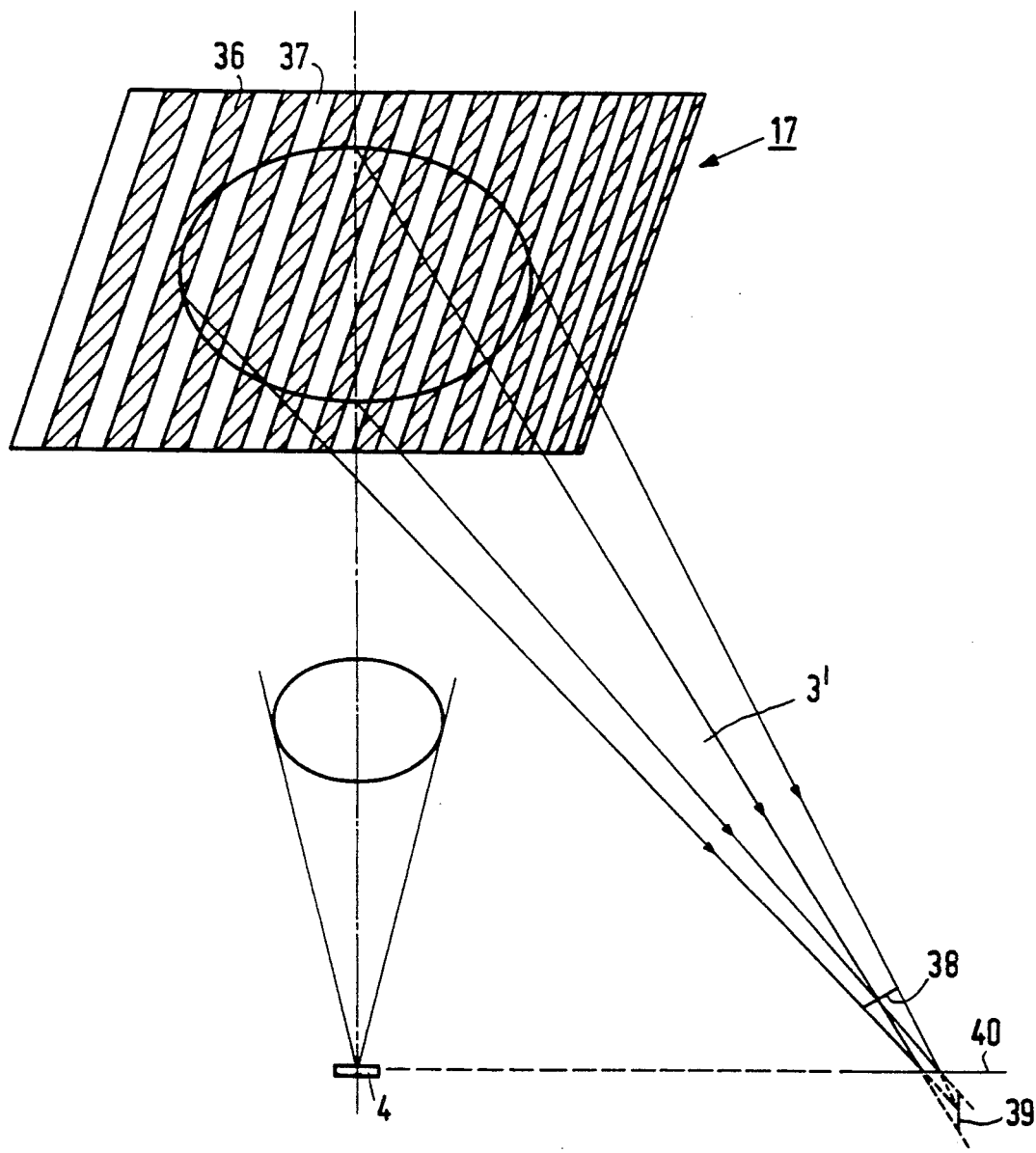
Figure 6:
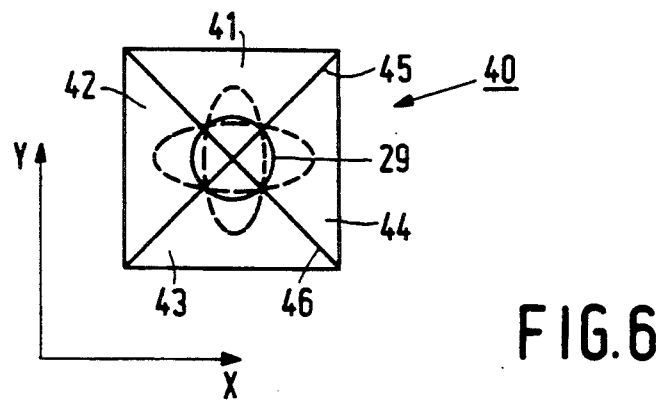
Figure 7:
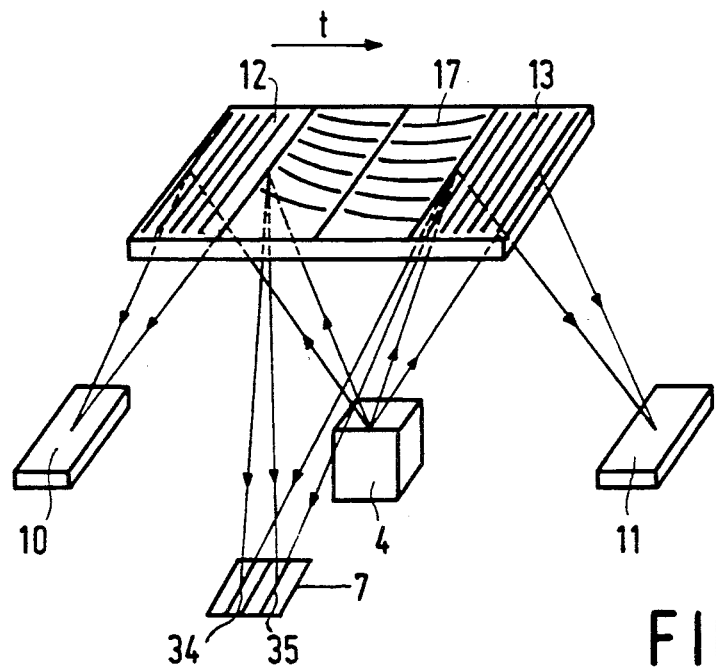
Figure 8:
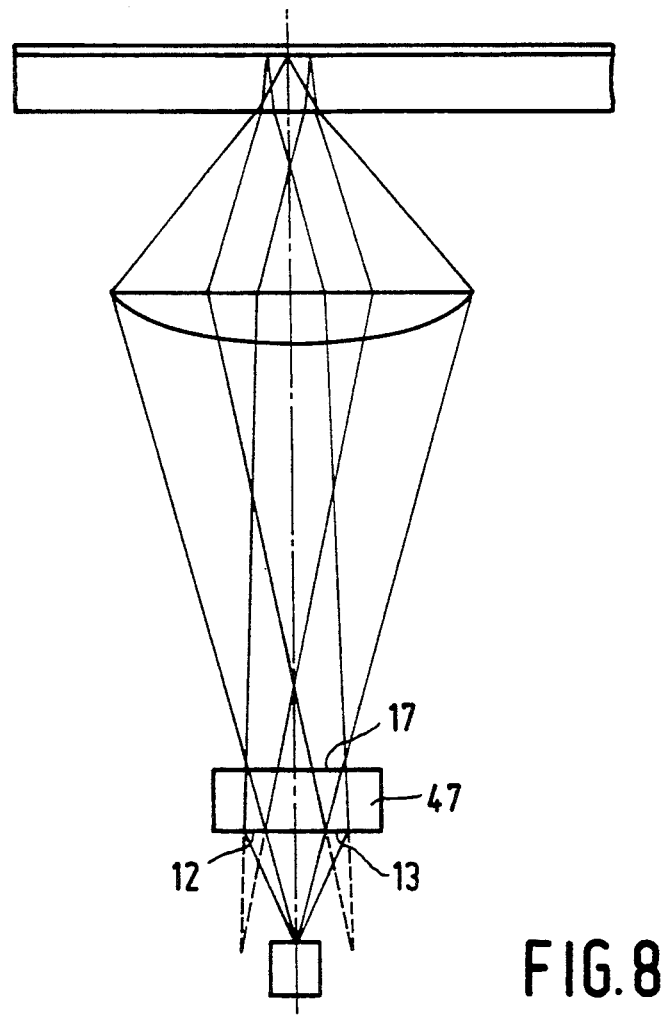
Figure 9:
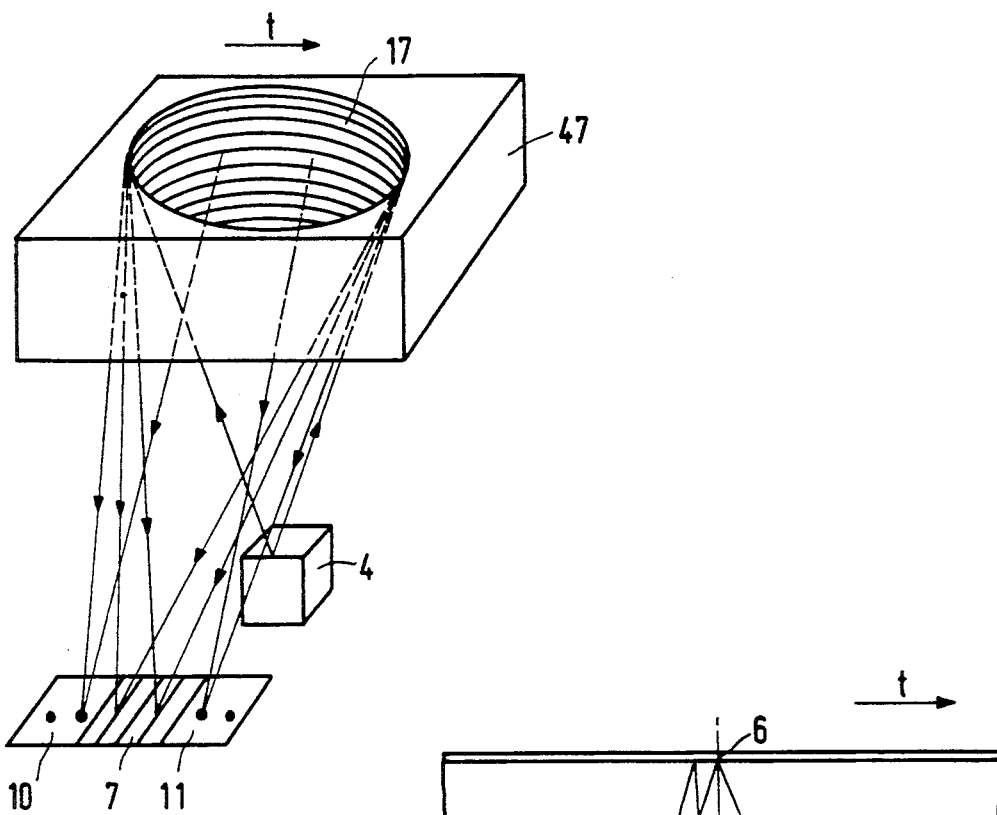
Figure 10:
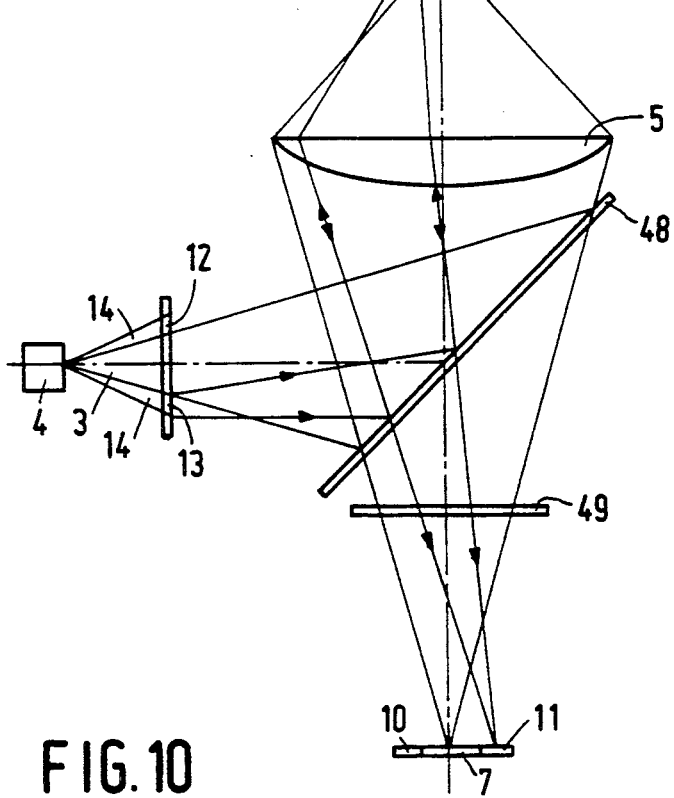

Embodiments of the invention will now be described in greater detail with reference to the accompanying drawings in which FIG. 1 shows a first embodiment of the device according to the invention, FIG. 2 shows a part of a second embodiment of the device comprising two detection systems for the scanning beam, FIGS. 3 and 4 show two embodiments of the main grating and the associated detection systems, FIG. 5 shows a third embodiment of the main grating, FIG. 6 shows the associated detection system, FIG. 7 is a perspective view of a part of a third embodiment of the scanning device, FIGS. 8 and 9 show further embodiments of the device according to the invention, FIG. 10 shows a fifth embodiment of the device.

FIG. 1 is a tangential cross-section of a small part of a disc-shaped optical record carrier 1 having a radiation-reflecting information plane 2. The information plane comprises a plurality of tracks (not shown) which are parallel to the plane of the drawing in this embodiment, i.e. in the direction denoted by arrow t. Information may be stored in these tracks in a succession of information areas, which are not shown and which alternate with intermediate areas. The information plane is scanned by a beam 3 emitted by a radiation source 4, for example, a diode laser. The scanning beam is focused to a scanning spot 6 on the information plane by means of an objective system 5 shown diagrammatically by means of a single lens. The device may include a separate collimator lens which is arranged in front of the objective system. The scanning beam scans a track by moving the record carrier in the direction of the tracks. The information stored in the track modulates the reflected scanning beam. The scanning beam may be modulated in, for example, intensity or in its state of polarization. This beam is focused by the objective system on a detection system 7 where the modulation is converted into an electric information signal.

In order to keep the centre of the scanning spot accurately positioned on the centre line of a track to be scanned, the device must have facilities to detect the distance between the scanning spot and the track in a direction which is perpendicular to the information plane and in a direction in the plane, and to minimize this deviation by means of the obtained focus error and tracking error signals.

The tracking error signal may be generated in known manner by means of two tracking beams which are focused by the objective system to two tracking spots 8 and 9 close to the scanning spot. The objective system images each tracking spot in radiation spots 8' and 9' on tracking detectors 10 and 11, respectively. The tracking error signal is constituted by the difference between the signals of these tracking detectors.

As described in European Patent Application 0,305,169, the tracking beams can be obtained by means of a diffraction grating arranged in the radiation path of the scanning beam and in front of the objective system 5. This grating splits the incident radiation beam into, inter alia, an ongoing zero-order beam and two deflected first-order beams. The objective system focuses the zero-order beam in the scanning spot 6 and the first-order sub-beams in two tracking spots. In the known device the grating is arranged in the beam which is captured by the objective system, hence in the scanning beam. Since the power of these beams is distributed over these three order beams, the power of the scanning spot may be 40% smaller than in the case where no grating is arranged in the scanning beam. This is particularly detrimental in a scanning device with which information can be inscribed at a high speed. Moreover, the power in the tracking spots may become so large that these spots cause optical changes in the information layer, and hence also inscribe.

According to the invention the tracking beams are formed by means of two grating parts 12 and 13, referred to jointly as the tracking grating in this description, which are arranged outside the path of the scanning beam and which deflect portions 14 of the source radiation outside the scanning beam 3 towards the objective system 5. The fact is then utilized that the diode lasers used in the scanning devices supply a radiation beam which has an elliptical cross-section and whose border portions outside the central round portion, which is used for the formation of the scanning spot, have a radiation power which is comparable to that of the central portion. Whereas in known devices this power in the border portions is not utilized, this power is now used for forming the tracking spots 8 and 9.

Due to the shape of the border portions 14 in the direction perpendicular to the plane of the drawing, the tracking beams in FIG. 1 may have a larger dimension than in the plane of the drawing. The tracking spots will consequently be elongated, with their major axes in the direction of the tracks. The tracking spots are narrow in the direction perpendicular to the tracks, which is necessary for a satisfactory tracking. The spots are sometimes large in the direction of the tracks, which does not affect the tracking. The quality of the wave front of the border portions is satisfactory enough to avoid deformation of the tracking spots.

The tracking gratings are used for coupling out the reflected tracking beams in the embodiment of FIG. 1. For generating the tracking error signal the zero-order portions of the reflected tracking beams, as denoted by the broken lines and the reference numerals 15 and 16 in FIG. 1, could in principle be used for generating the tracking error signal. However, the portions of the tracking beams diffracted in the first or higher orders are preferably used so that the tracking detectors can be arranged at a sufficiently large distance from the radiation source. The power in the border portions 14 of the source radiation is so large that the tracking beams incident on the tracking detectors 10 and 11, which beams are diffracted twice in a first order, are still powerful enough to generate a tracking error signal having a sufficiently large signal-to-noise ratio.

When reading an inscribed record carrier, the scanning beam modulated and reflected by the record carrier must be separated from the beam going to the record carrier. Moreover, the scanning device must include a focus error detection system for generating a focus error signal, i.e. a signal which is representative of a deviation between the focal plane of the objective system 5 and the information plane 2, with which signal the position of the scanning beam focus can be corrected, for example, by displacing the objective system along its axis.

As described in U.S. Pat. No. 4,829,506, a diffraction grating can be used for establishing both the desired beam separation and for giving the reflected scanning beam such a shape that it is suitable for focus error detection.

According to the present invention this grating 17, referred to as main grating in this description, can be arranged between the grating parts 12 and 13 of the tracking grating. The scanning beam 3' deflected by this grating is received by the detection system 7. An information signal, i.e. a signal representing the information which has been read, as well as a focus error signal can be obtained by means of this detection system.

In the embodiment of FIG. 1 the main grating 17 is implemented in such a way that the reimage 6' of the scanning spot 6, which reimage is formed by means of a beam portion diffracted in a first order by the main grating, is formed in the vicinity of a tracking detector, for example, detector 11. Its advantage is that the detection system 7 and the tracking detector 11 can be integrated on one substrate.

To obtain a sufficient light power in said first-order beam portion 3', it is conventional practice to give the walls of the grating grooves a specific slope, i.e. to "blaze" the grating.

Another possibility of obtaining sufficient light is to use the beam portions diffracted in the +1st order and in the −1st order for the information read-out and possibly for the focus error detection. This is illustrated in FIG. 2 showing the part of the scanning device below the main grating 17. Two images 6' and 6" of the scanning spot 6 are formed on the detection system 7 and a second detection system 18 by means of the two first-order beam portions 3' and 3", respectively. An information signal of satisfactory quality can be obtained by combining the signals supplied by the two detection systems.

The scanning device shown diagrammatically in FIG. 2 is eminently suitable for writing and reading so-called magneto-optical record carriers. Such record carriers and write and read devices for these carriers are described in, inter alia, the article: "Erasable magneto-optical recording" in "Philips Technical Review" vol. 42, no. 2, 1985, pp. 37–47. As described in this article, a so-called differential method is preferably used when reading a magneto-optical record carrier. The radiation reflected by the information plane, with its direction of polarization being modulated in time in conformity with the information being read, is split into two mutually perpendicularly polarized sub-beams incident on separate detectors, after this radiation has traversed the objective. In the known device the beam splitting is realised by a polarization-sensitive beam splitter.

The scanning device of FIG. 2 does not require such a beam splitter because the grating 17 already supplies two spatially separated beams. Only two linear polarizers (analysers) 19 and 20 which are mutually perpendicularly oriented are then to be arranged in front of the detection systems 7 and 18 so that the beam portion 3' incident on the detection system 7 has a first direction of polarization and the beam portion 3" incident on the detection system 18 has a second direction of polarization perpendicular to the first direction of polarization.

The tracking detectors 10 and 11 in the magneto-optical scanning device may also be integrated with the detection systems 18 and 10, respectively, on one substrate.

FIG. 3 shows a first embodiment of a main grating which, together with an adapted detection system, is suitable for generating a focus error signal in accordance with the Foucault method. In this FIG. the beam 3 is denoted by its cross-section at the location of the grating 17. This grating comprises two sub-gratings 21 and 22 which are separated from each other by the line 23. The grating strips of the sub-gratings are denoted by 24 and 25. These grating strips are separated by intermediate strips 26 and 27. In this embodiment the sub-gratings have the same grating periods, but the main directions of the preferably curved grating strips 24 of the sub-grating 21 extend at a first angle to the bounding line 23, while the main directions of the curved grating strips 25 of the second sub-grating 22 extend at a second, preferably equally large but opposite angle to the bounding line. The sub-beams are mainly deflected in a direction transverse to the main directions. Since the main directions are different, the sub-beams 28a and 28b are deflected at different angles in the XY plane. This means that the radiation spots 29a and 29b are offset with respect to each other in the Y direction in the plane of the detectors, the XY plane. The references X, Y and Z in this FIG. and the subsequent FIGS. denote the axes of a system of coordinates whose origin 0 coincides with the centre of the radiation-emitting surface of the diode laser 4.

Radiation-sensitive detectors in the form of photodiodes 30 and 31, and 32 and 33, which are separated by narrow strips 34 and 35, are associated with each sub-beam 28a and 28b, respectively. These detectors are positioned in such a way that the intensity distribution of the radiation spots 29a and 29b formed by the sub-beams 28a and 28b is symmetrical with respect to the detectors 30 and 31, and 32 and 33, respectively, when the beam 3 is correctly focused on the information plane 2. When a focus error occurs, the radiation spots 29a and 29b become asymmetrically larger and the centre of the radiation distribution of each of these radiation spots is displaced transversely to the bounding strips 34 and 35, respectively, of the associated detector pair.

If the output signals of the detectors 30, 31, 32 and 33 are represented by $s_{30}$, $s_{31}$, $s_{32}$ and $s_{33}$, the focus error signal $S_f$, is defined by:

$$S_f = (s_{30} + s_{33}) - (s_{31} + s_{32})$$

A signal which is proportional to the information being read, or the information signal $S_i$ is defined by:

$$S_i = s_{30} + s_{31} + s_{32} + s_{33}.$$

For generating a focus error signal not only the composite main grating of FIG. 3 but also the main grating 17 shown in FIG. 4 may be used. The cross-section of the beam 3 the plane and the sub-beams beams 28a and 28b are shown in this FIG. The main directions of the preferably curved grating strips of the two sub-gratings 21 and 22 now extend at the same angle to the bounding line 23, while the average grating period of the two sub-gratings is different. Consequently, the angle at which the sub-beam 28a is deflected differs from the angle at which the sub-beam 28b is deflected. This means that the radiation spots 29a and 29b are offset with respect to each other in the direction of the bounding line 23 in the plane of the detectors 30, 31, 32 and 33.

The sub-gratings 21 and 22 may be straight grating strips and have a constant grating period. However, a type of grating, also referred to as hologram, which has a varying grating period, is preferably used, the variation in the period being, for example, of the order of several percents of the average grating period. Moreover, as shown in FIGS. 3 and 4, the grating strips of the two sub-gratings are curved. These sub-gratings thus have a variable lens action. Due to the varying grating period the positions of the radiation spots 29a and 29b can be varied by displacing the grating 17 in its own plane. Aberrations in a direction perpendicular to the direction of the bounding line 23 can be minimized by suitable curvatures of the grating strips. The possibility of displacing the positions of the radiation spots is particularly important if an integrated laser-photodiode unit is used, i.e. a component in which the diode laser and the photodetectors are arranged on one support and are thus fixed with respect to each other and consequently have a fixed mutual distance in the Z direction. This distance is liable to manufacturing tolerances and cannot be corrected during assembly of the device by displacing the photodiodes with respect to the laser diode in the Z direction.

An important advantage of the diffraction grating using curved grating strips, or hologram, as compared with a grating having straight grating strips is that the optical aberrations such as coma and astigmatism, which may occur when using the last-mentioned grating, can be obviated in the first-mentioned grating by taking these aberrations into account and adapting the curvatures of the grating strips thereto when manufacturing this holographic grating.

FIG. 5 shows an embodiment of a grating 17 which converts the reflected scanning beam 3 into an astigmatic beam 3' so as to generate a focus error signal in accordance with the astigmatic method. In principle, this grating has straight grating strips 36 and a linearly varying grating period. The grating may be dimensioned in such a way that the radiation of the reflected beam 3 is largely diffracted in one order, for example, the +1st order. The first-order beam 3' is no longer focused in one point but in two mutually perpendicular focal lines 38 and 39, the line 38 being located at a position where the beam 3' would be focused if the grating were not astigmatic. The focal lines 38 and 39 move simultaneously in the same direction and over the same distance when a focus error occurs. A so-called four-quadrant detector 40 is arranged in a plane approximately halfway between the positions occupied by the astigmatic focal lines if the scanning beam is sharply focused on the information plane. This detector, which is shown in FIG. 6, comprises four detectors 41, 42, 43 and 44 located in four different quadrants around the chief ray of the diffracted beam 3'. If the scanning beam is sharply focused on the information plane 2, the radiation spot 29 formed by the beam 3' in the plane of the detectors is round, as is indicated by means of the solid-line circle in FIG. 6. If a focus error occurs, the radiation spot 29 is deformed to an elliptical spot, as is indicated by means of the broken-line ellipses in FIG. 6. The major axis of the ellipse extends at an angle of 45° to the bounding strips 45 and 46, the sign of the angle being determined by the sign of the focus error. If the signals of the detectors 41, 42, 43 and 44 are represented by $s_{41}$, $s_{42}$, $s_{43}$ and $s_{44}$, the focus error signal $S_f$ is defined by:

$$S_f = (s_{41} + s_{43}) - (s_{42} + s_{44}).$$

If the main grating splits a first-order beam into two focus detection beams or if it renders the beam astigmatic, it is recommendable to carry out the focus detection in one of the two detection systems 7 and 18. The beams for the other detection system generally do not have the correct shape for focus detection.

FIG. 7 shows a part of an embodiment of the scanning device in which the main grating 17 deflects the reflected scanning beam 3 in a direction perpendicular to the direction t of the tracks. The main grating and the detection system 7 are shown in this FIG. for the Foucault focus detection. The tracks in the information plane cause overlapping diffraction orders in the reflected scanning beams. In the case of Foucault focus detection these orders in the geometry of FIGS. 1, 2 and 3 ensure that a tracking error influences the focus error signal. In the geometry of FIG. 7 these orders can no longer influence the focus error signal because the bounding strips 34 and 35 are perpendicular to direction t.

FIG. 8 shows another embodiment of the device in a cross-section. Unlike the beams shown in FIG. 1, the reflected tracking beams do not traverse the tracking gratings 12 and 13 but are deflected towards the tracking detectors by the main grating 17. In this geometry the gratings 17, 12 and 13 can be arranged at two sides of one substrate 47. As a result, the gratings are mounted in a stable manner with respect to each other. It is also advantageous in manufacture and simple in assembly and alignment.

FIG. 9 is a perspective elevational view of the lower part of FIG. 8. For the sake of clarity the border portions of the beam and the tracking gratings are not shown. For the same reason only one of the two beams towards each tracking detector 10 and 11 is shown. The main grating 17 deflects the reflected tracking beams in a direction perpendicular to the track direction t. As in FIG. 7, this has the advantage that tracking errors do not influence the focus error signal when the Foucault focus detection method is used. The tracking detectors 10 and 11 and the detection system 7 can be integrated on one substrate. In FIG. 9 the main grating 7 and the detection system 17 are implemented in accordance with FIG. 3. However, in the embodiment of FIG. 9 the gratings and detection systems according to FIGS. 4 and 5 may be used alternatively. The use of linear polarizers for detecting a scanning beam modulated by means of the magneto-optical effect is possible, although the deflected scanning beam must then be split into two beams and an additional detection system is required when generating the astigmatic focus error.

It will be evident that a large number of said advantages of the tracking grating according to the invention also applies to an optical system which does not use a grating as a beam-separating element but, for example, a partially transparent mirror 48, as in the embodiment of FIG. 10. For the sake of clarity this FIG. shows only one of the two tracking beams. The tracking detectors 10 and !1 and the detection system 7 can be integrated on one substrate. For generating the focus error signal an additional element 49, for example, a beam-splitting wedge or an astigmatic element such as a cylindrical lens must be arranged in the path of the reflected scanning beam. However, it is also possible to utilize the fact that a beam-separating plate 48, which is traversed obliquely, has an astigmatic effect.

We claim:

1. A device for optically scanning a radiation-reflecting information plane having tracks, which device comprises a radiation source supplying a scanning beam, an objective system for focusing the scanning beam to a scanning spot in the information plane and for reimaging the scanning spot on a radiation-sensitive detection system for generating an information signal, and a tracking grating arranged in the radiation path between the radiation source and the objective system for forming two tracking beams which are focused by the objective system in two tracking spots in the information plane, said spots being reimaged on two tracking detectors for generating a tracking error signal, characterized in that the tracking grating comprises two parts located in one plane at both sides of the scanning beam, which parts capture border portions of the beam from the radiation source.

2. A device as claimed in claim 1, characterized in that a part of the scanning beam reflected by the information plane is deflected towards the detection system by a main grating which is arranged in the radiation path of the scanning beam between the radiation source and the objective system, the plane of the main grating being parallel to the plane of the tracking grating.

3. A device as claimed in claim 2, characterized in that the main grating and the tracking grating are located in one plane.

4. A device as claimed in claim 3, characterized in that the tracking beams are border portions of the beam from the radiation source which are diffracted in the +1st and −31st orders by the tracking grating.

5. A device as claimed in claim 4, characterized in that the tracking grating is arranged in the radiation path of the tracking beams reflected by the information plane.

6. A device as claimed in claim 5, characterized in that the main grating deflects the reflected scanning beam towards the tracking detectors.

7. A device as claimed in claim 6, characterized in that an additional detection system is provided, the two detection systems capturing the radiation of the portions of the reflected scanning beam diffracted in the +1st order and the −1st order, respectively.

8. A device as claimed in claim 6, characterized in that at least one detection system is integrated with a tracking detector on one substrate.

9. A device as claimed in claim 5, characterized in that the main grating deflects the reflected scanning beam in a direction perpendicular to the direction of the tracks.

10. A device as claimed in claim 2, characterized in that the main grating is also arranged in the radiation path of the reflected tracking beams.

11. A device as claimed in claim 10, characterized in that the main grating deflects the reflected scanning beam and tracking beams in a direction perpendicular to the direction of the tracks.

12. A device as claimed in claim 11, characterized in that the detection system and the tracking detectors are integrated on one substrate.

13. A device as claimed in claim 7, suitable for reading an information plane by means of the magneto-optical effect, characterized in that a linear polarizer is arranged in front of each detection system in the radiation path of the reflected scanning beam, the two polarizers being oriented mutually perpendicularly.

14. A device as claimed in claim 11, characterized in that the main grating comprises two parts for forming two focus detection beams, and in that the detection system comprises two radiation-sensitive detectors for each one of these beams.

15. A device as claimed in claim 11, characterized in that the main grating introduces astigmatism in a deflected beam, and in that the detection system comprises a radiation-sensitive four-quadrant detector.

16. A device as claimed in claim 1, characterized in that the tracking beams are border portions of the beam from the radiation source which are diffracted in the +1st and −1st orders by the tracking grating.

17. A device as claimed in claim 1, characterized in that the tracking grating is arranged in the radiation path of the tracking beams reflected by the information plane.

18. A device as claimed in claim 2, characterized in that the main grating deflects the reflected scanning beam towards the tracking detectors.

19. A device as claimed in claim 2, characterized in that the main grating comprises two parts for forming two focus detection beams, and in that he detection system comprises two radiation-sensitive detectors for each one of these beams.

20. A device as claimed in claim 2, characterized in that the main grating introduces astigmatism in a deflected beam, and in that the detection system comprises a radiation-sensitive four-quadrant detector.

* * * * *